United States Patent
Adelmann et al.

(10) Patent No.: US 9,521,708 B2
(45) Date of Patent: Dec. 13, 2016

(54) OVEN RANGE APPLIANCE

(71) Applicant: General Electric Company, Schenectady, NY (US)

(72) Inventors: Christopher James Adelmann, Louisville, KY (US); Stephen Bernard Froelicher, Sheperdsville, KY (US); Kevin Scott Laundroche, Anchorage, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 351 days.

(21) Appl. No.: 14/152,304

(22) Filed: Jan. 10, 2014

(65) Prior Publication Data

US 2015/0201465 A1    Jul. 16, 2015

(51) Int. Cl.
| | |
|---|---|
| H05B 3/68 | (2006.01) |
| H05B 6/12 | (2006.01) |
| H05B 3/74 | (2006.01) |
| F24C 15/08 | (2006.01) |
| F24C 15/10 | (2006.01) |

(52) U.S. Cl.
CPC ............. *H05B 6/1245* (2013.01); *F24C 15/08* (2013.01); *F24C 15/10* (2013.01); *H05B 3/74* (2013.01); *H05B 2206/022* (2013.01); *Y02B 40/126* (2013.01)

(58) Field of Classification Search
CPC ...... F24C 15/10; H05B 2206/022; H05B 3/74; H05B 6/1245; Y02B 40/126
USPC ........................................... 219/443.1–468.2
See application file for complete search history.

(56) References Cited

U.S. PATENT DOCUMENTS

| | | | | |
|---|---|---|---|---|
| 3,385,284 A | * | 5/1968 | White | F24C 7/082 126/214 B |
| 3,567,906 A | * | 3/1971 | Hurko | H05B 3/748 219/461.1 |
| 4,900,899 A | * | 2/1990 | Schreder | H05B 3/748 219/447.1 |
| 5,185,047 A | * | 2/1993 | Ray | F24C 15/108 126/211 |
| 5,530,224 A | * | 6/1996 | Sassman | H05B 3/74 219/452.12 |
| 5,568,804 A | * | 10/1996 | Joseph | F24C 3/067 126/39 H |
| 5,571,434 A | * | 11/1996 | Cavener | H05B 3/74 219/452.12 |
| 5,791,336 A | * | 8/1998 | Helm | F24C 15/108 126/214 A |
| 5,841,109 A | * | 11/1998 | White | H05B 3/74 219/452.12 |
| 5,968,219 A | * | 10/1999 | Gille | C03B 23/023 264/339 |
| 6,067,980 A | | 5/2000 | Kahlke et al. | |
| 6,515,263 B2 | | 2/2003 | Mitra et al. | |
| D500,628 S | | 1/2005 | Laundroche et al. | |
| 2009/0294432 A1 | | 12/2009 | Baek | |

* cited by examiner

*Primary Examiner* — Sang Y Paik
(74) *Attorney, Agent, or Firm* — Dority & Manning, P.A.

(57) ABSTRACT

The present subject matter provides an oven range appliance. The oven range appliance includes a cabinet. The cabinet defines a width. A cooktop is positioned at a top portion of the cabinet. The cooktop includes a ceramic panel. The ceramic panel defines a width. The width of the ceramic panel is about equal to the width of the cabinet. Thus, the ceramic panel can extend across the width of the cabinet.

19 Claims, 15 Drawing Sheets

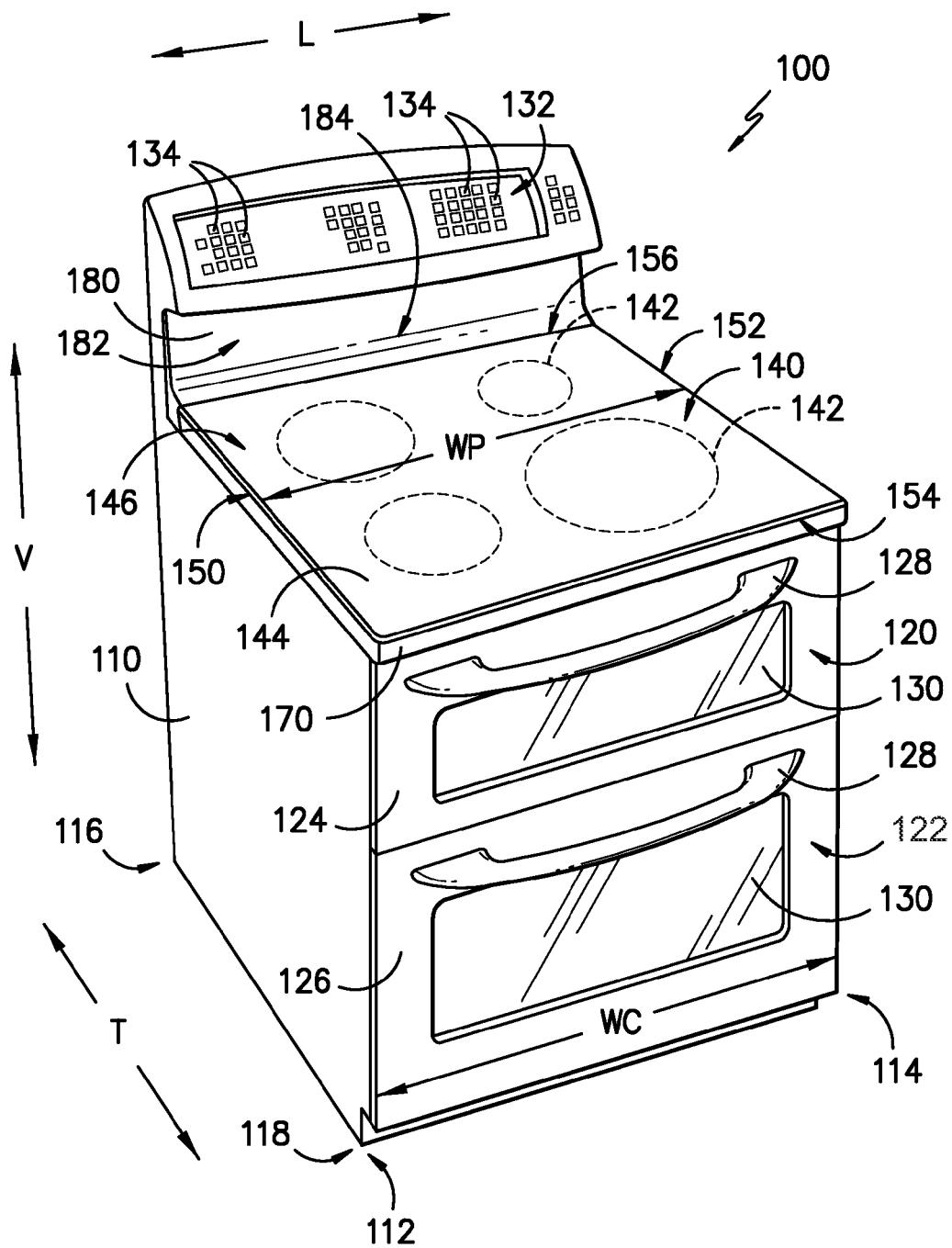
FIG. —1—

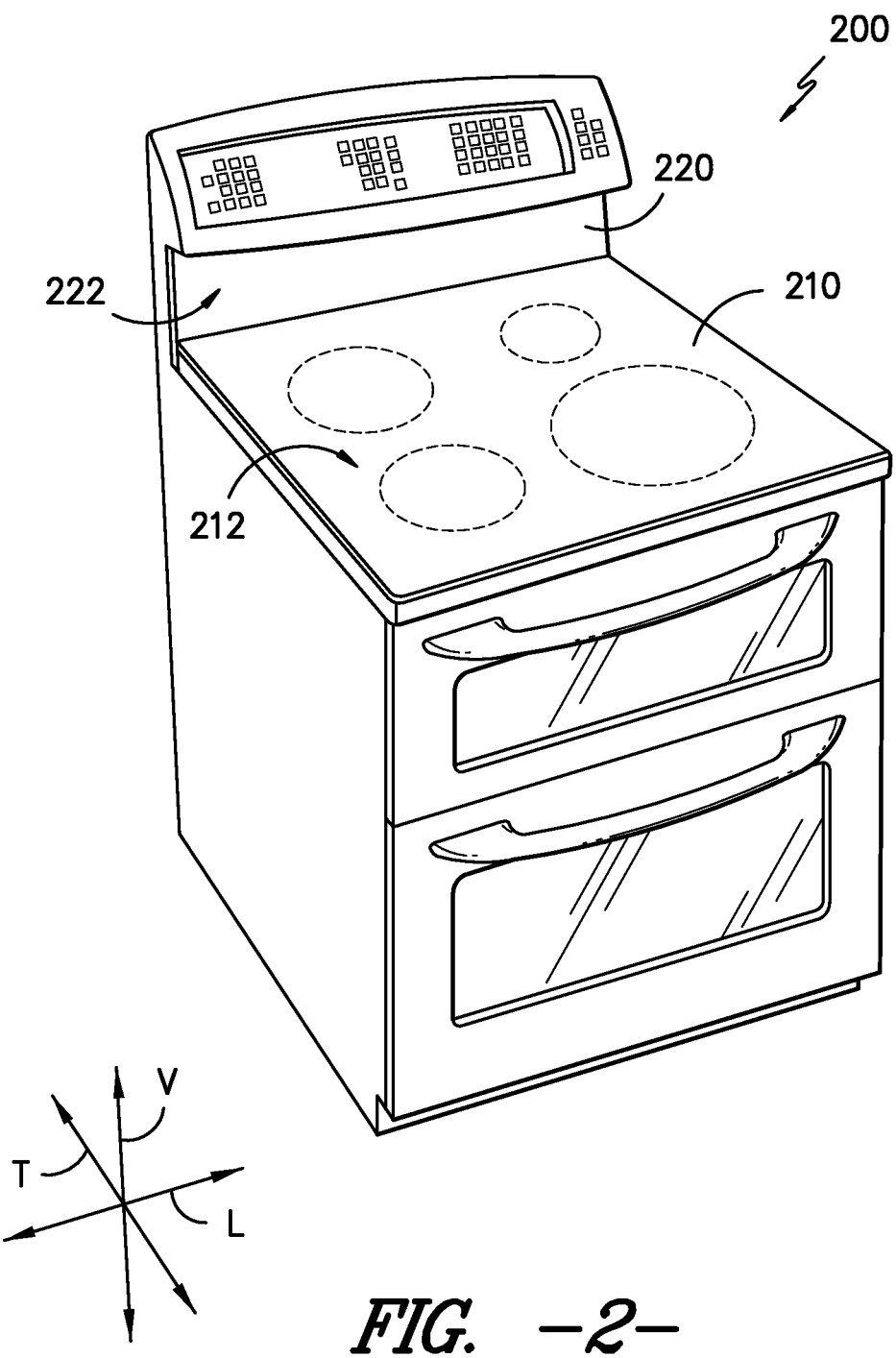
FIG. -2-

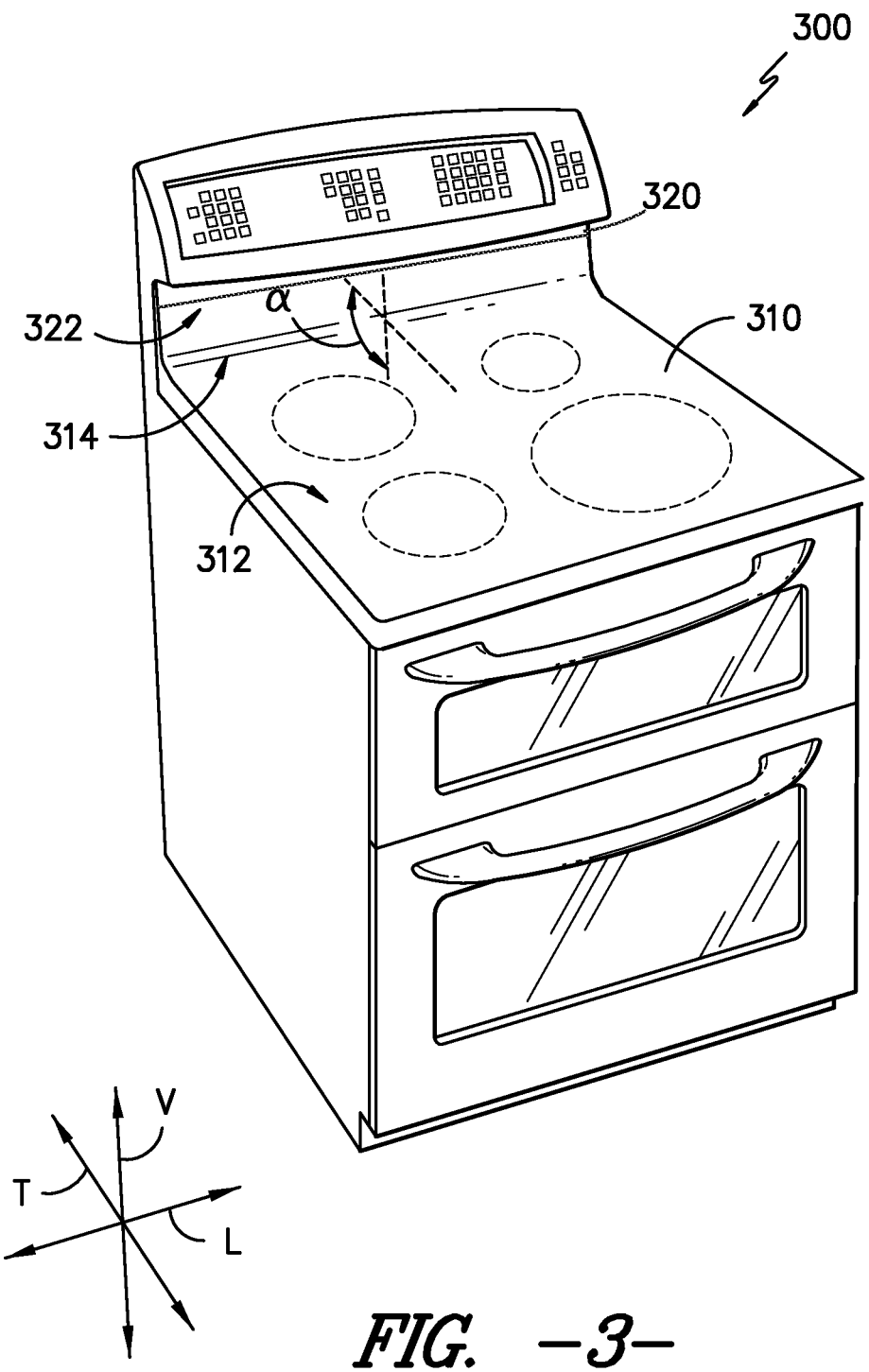
FIG. -3-

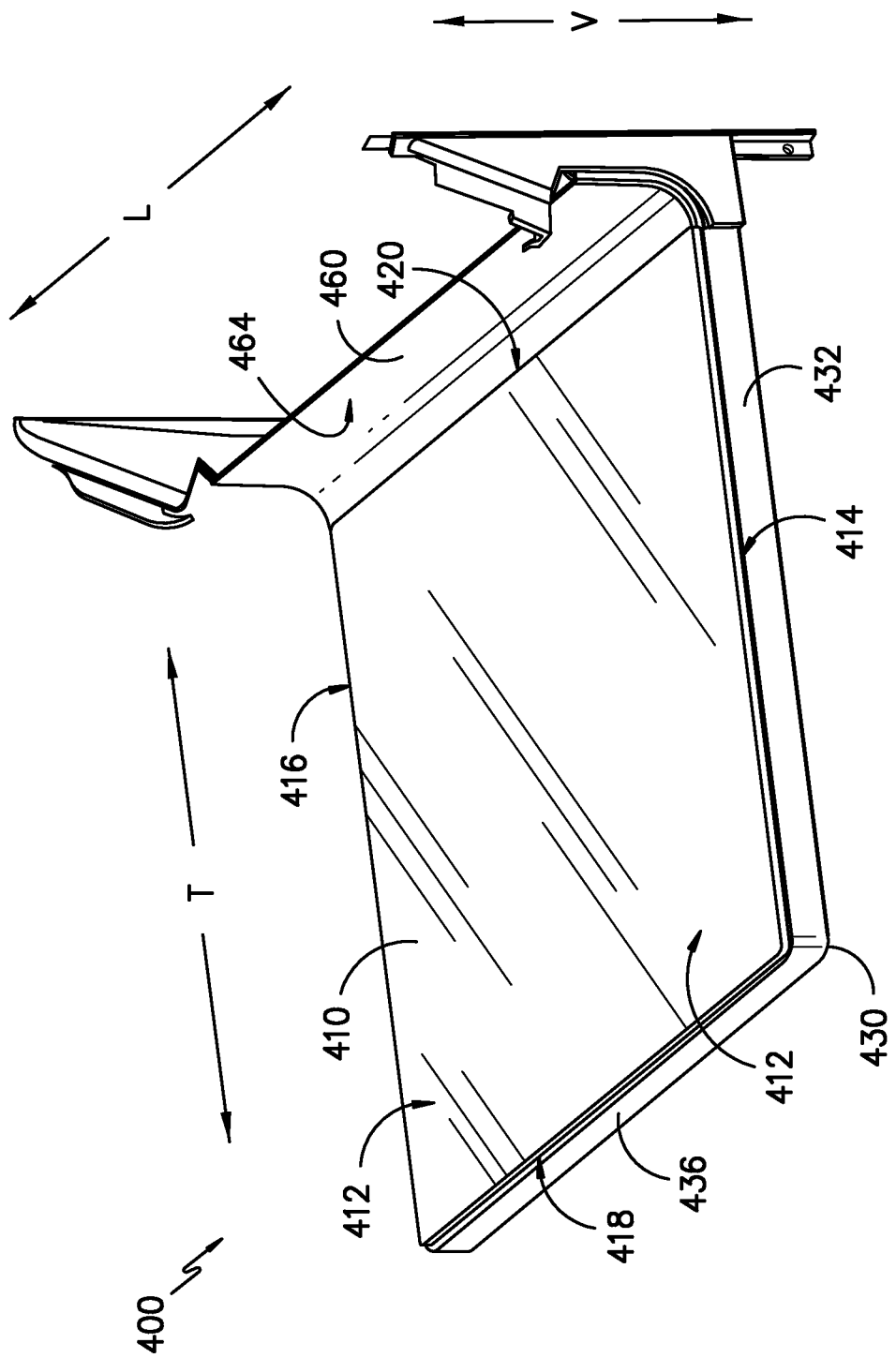
FIG. -4-

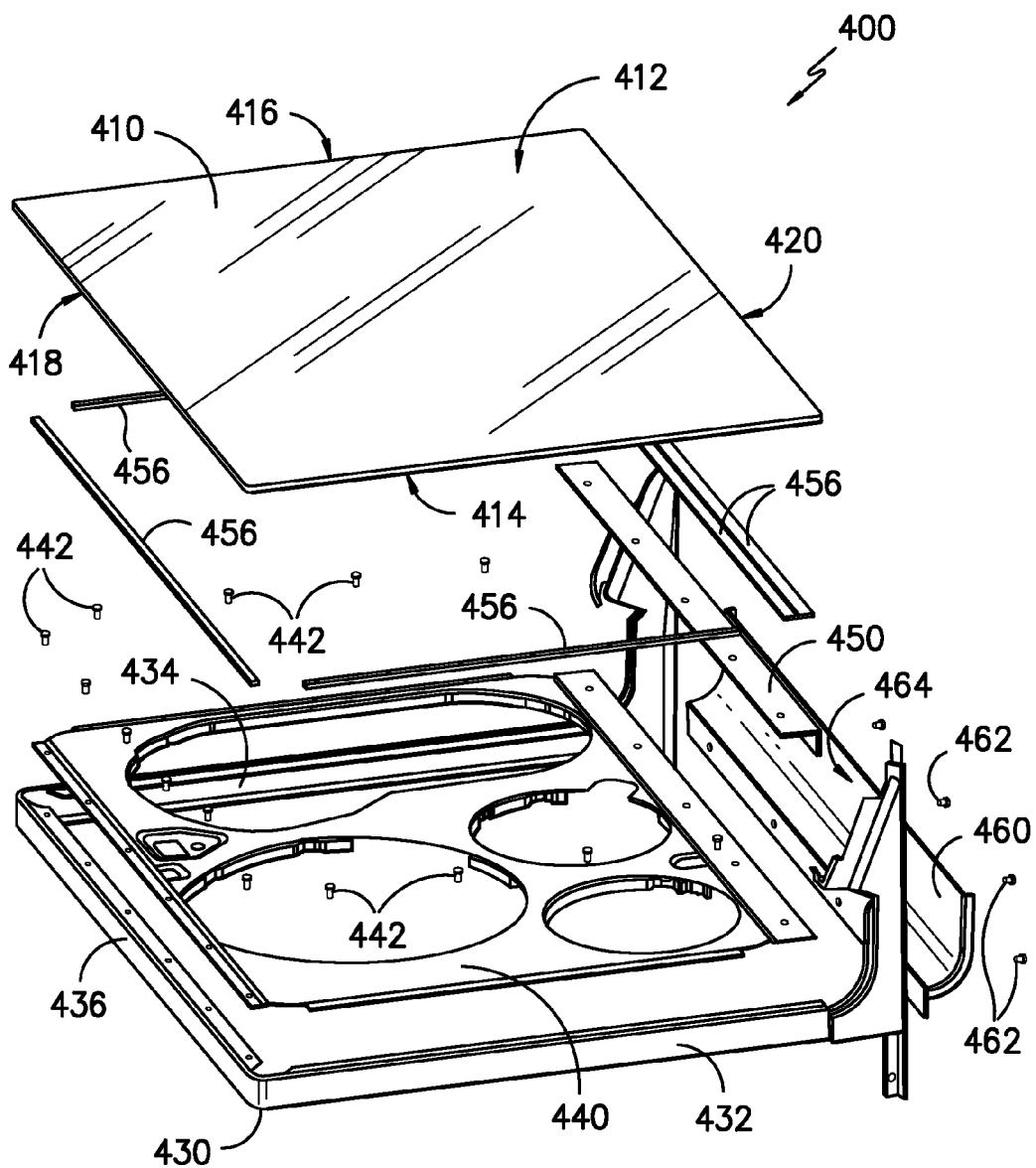
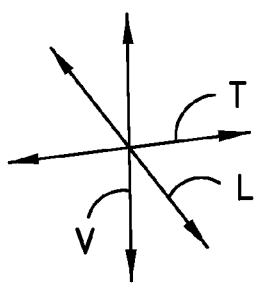
FIG. —5—

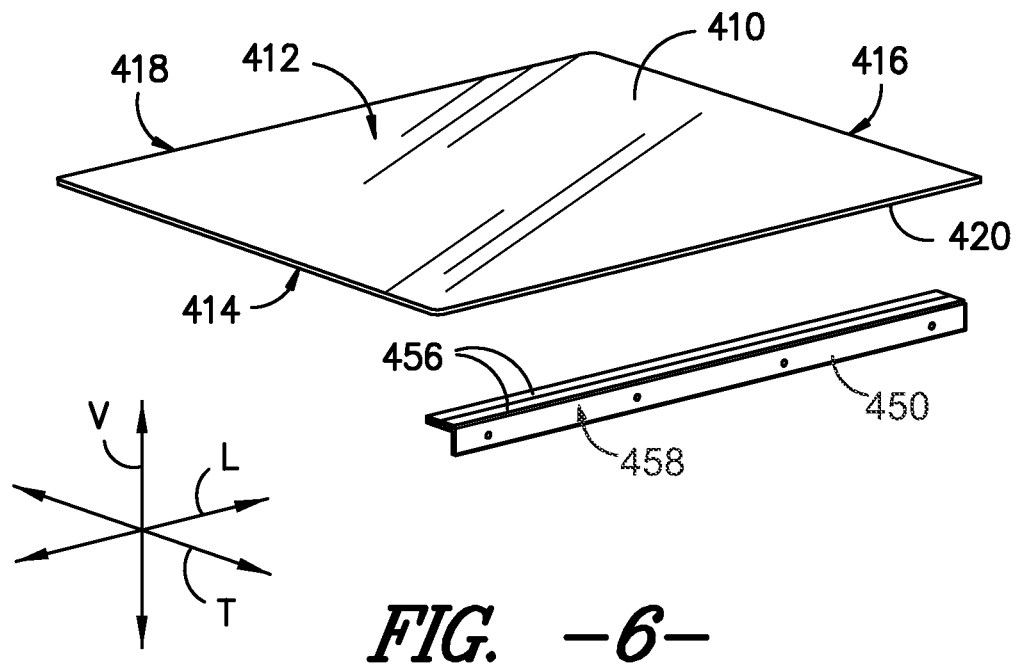
FIG. -6-
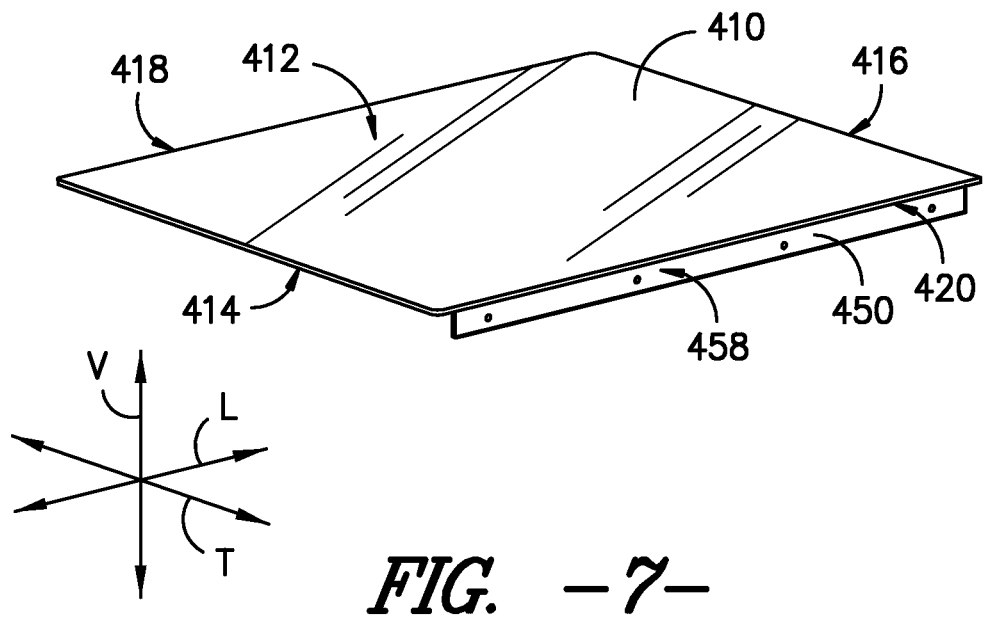
FIG. -7-

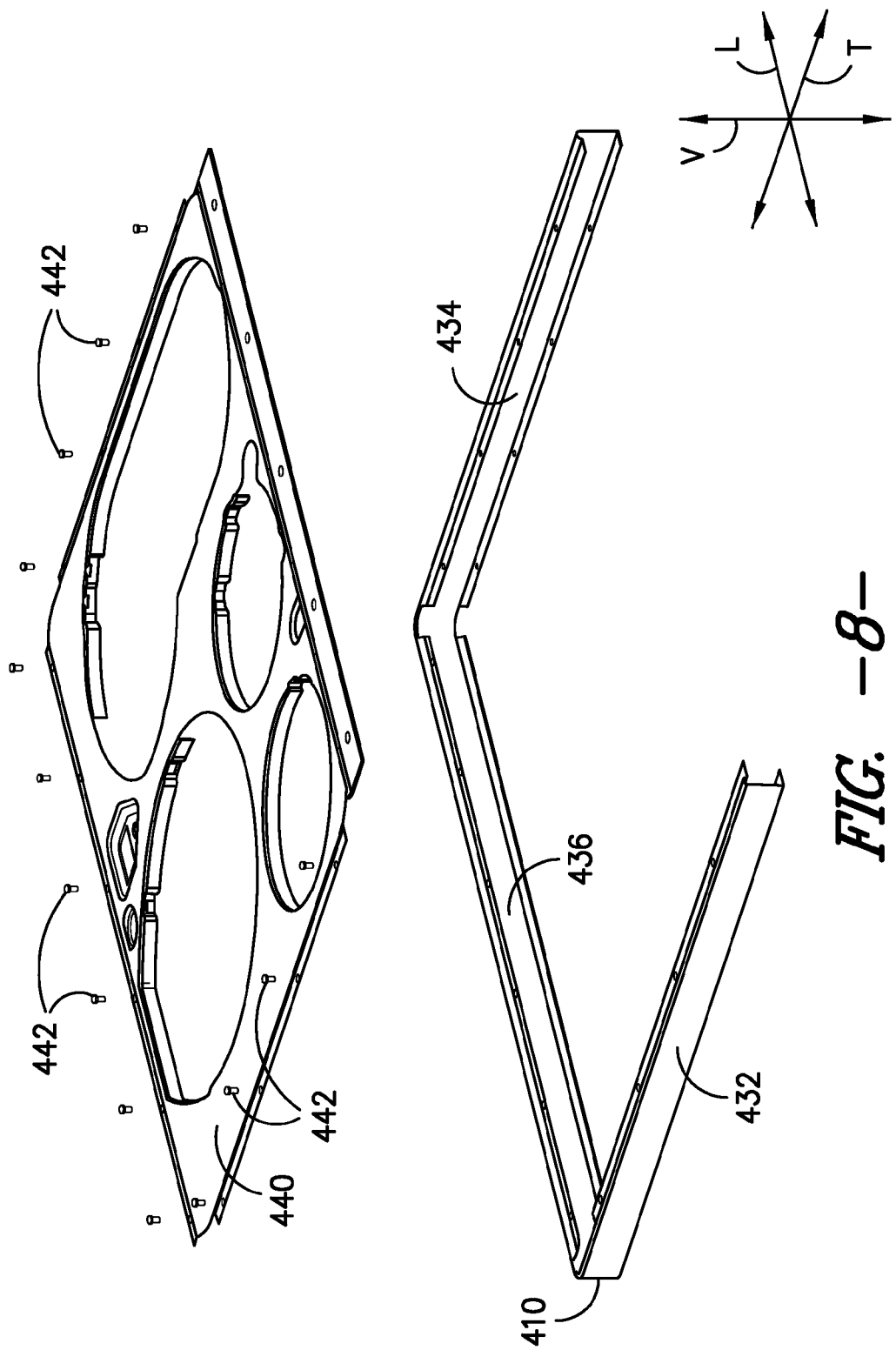
FIG. -8-

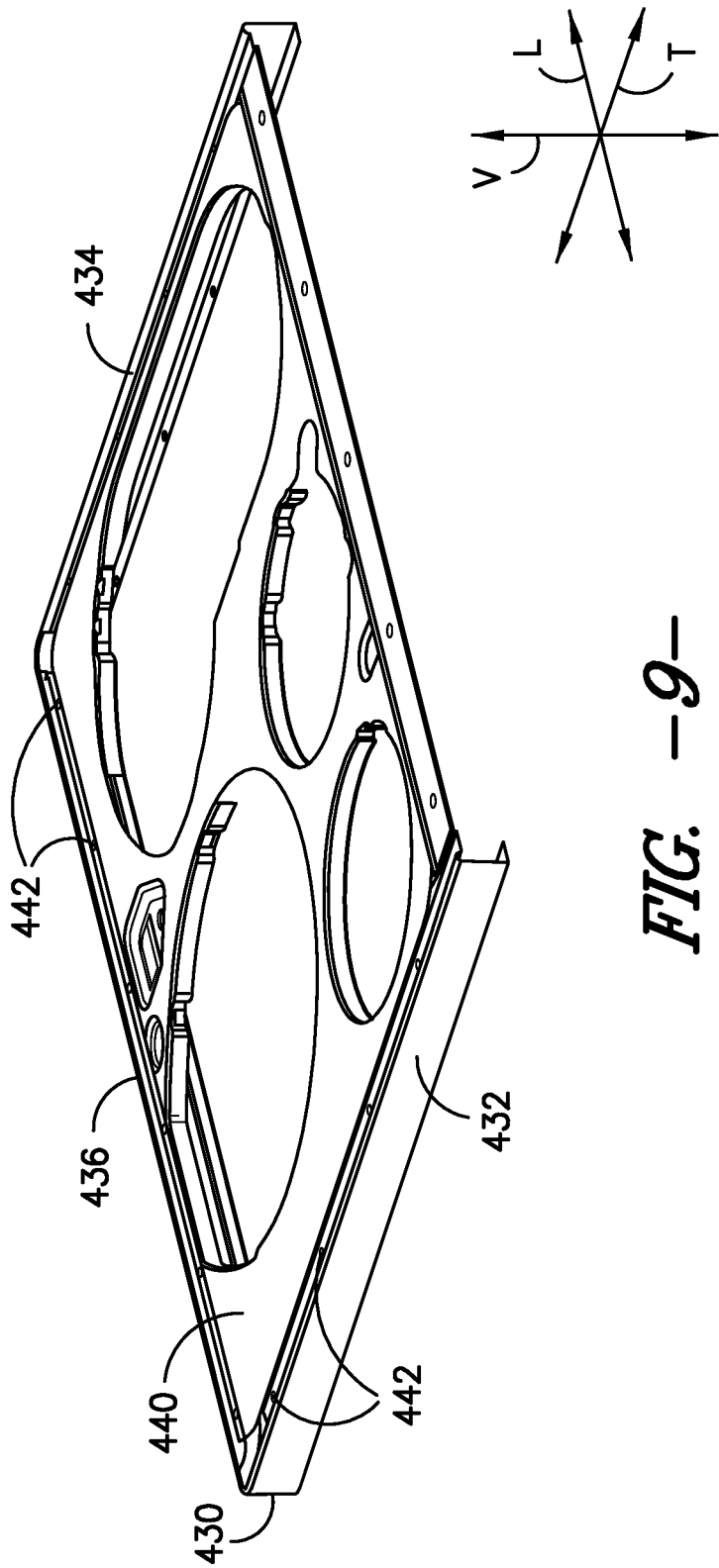
FIG. -9-

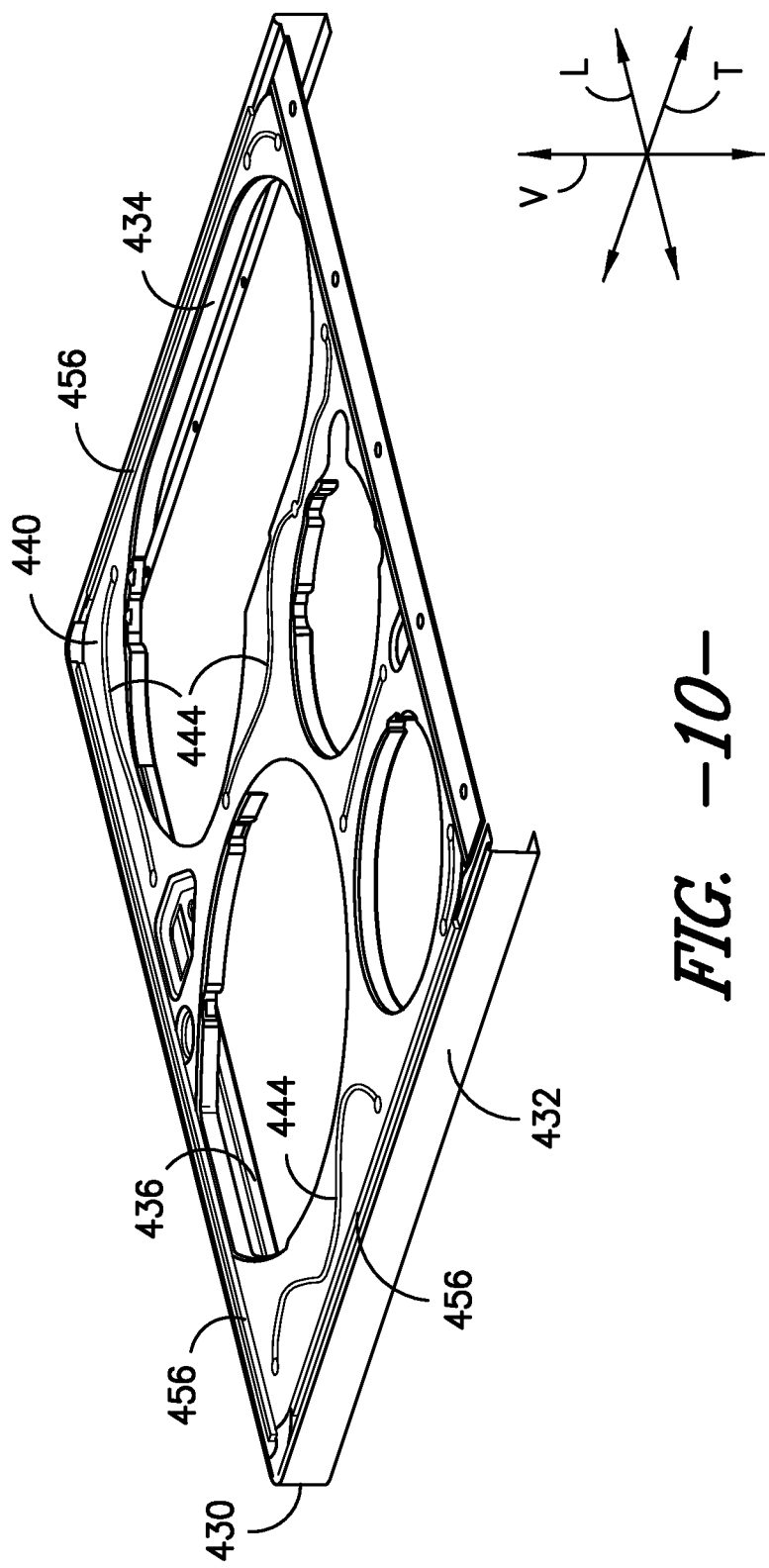
FIG. -10-

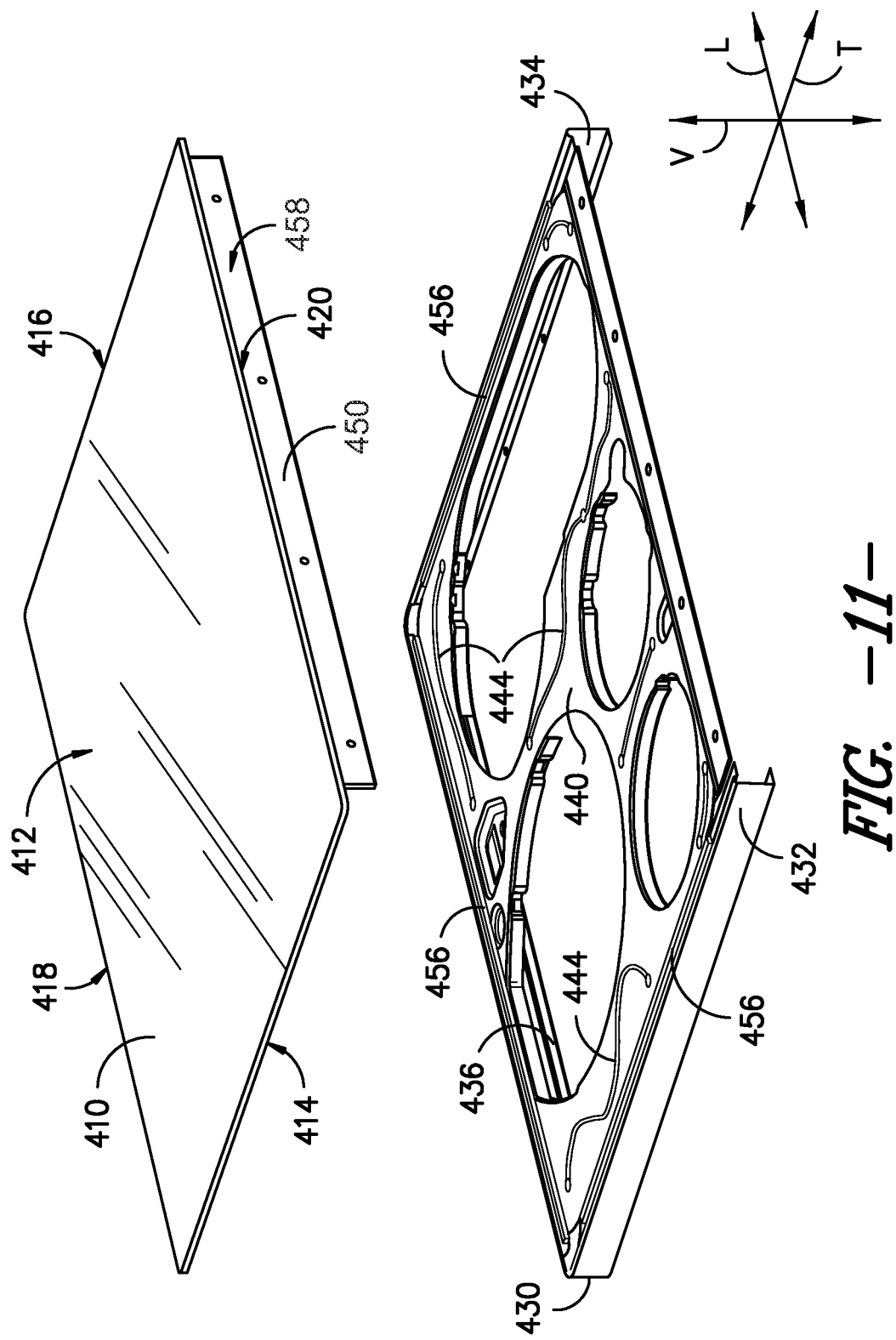
FIG. -11-

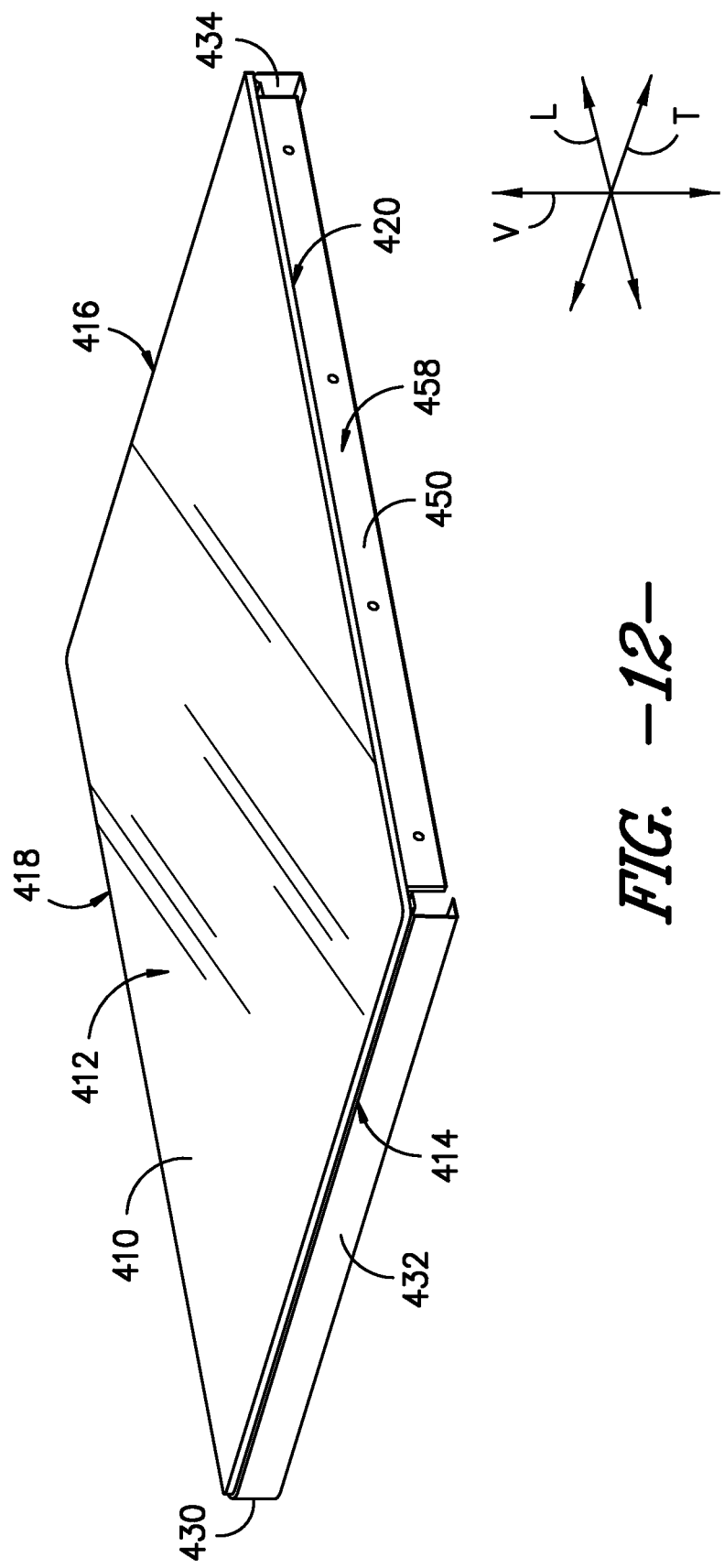

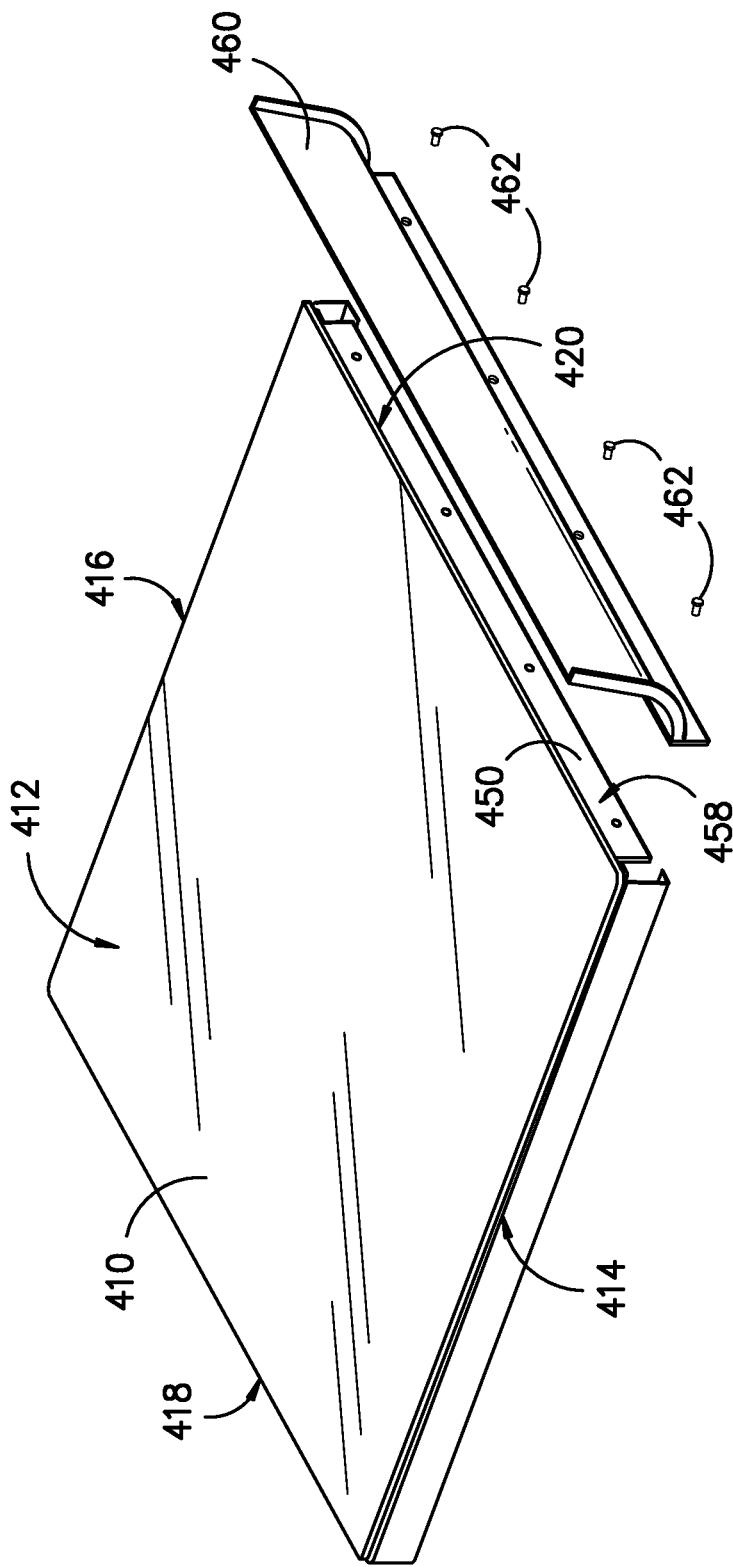
FIG. -13-

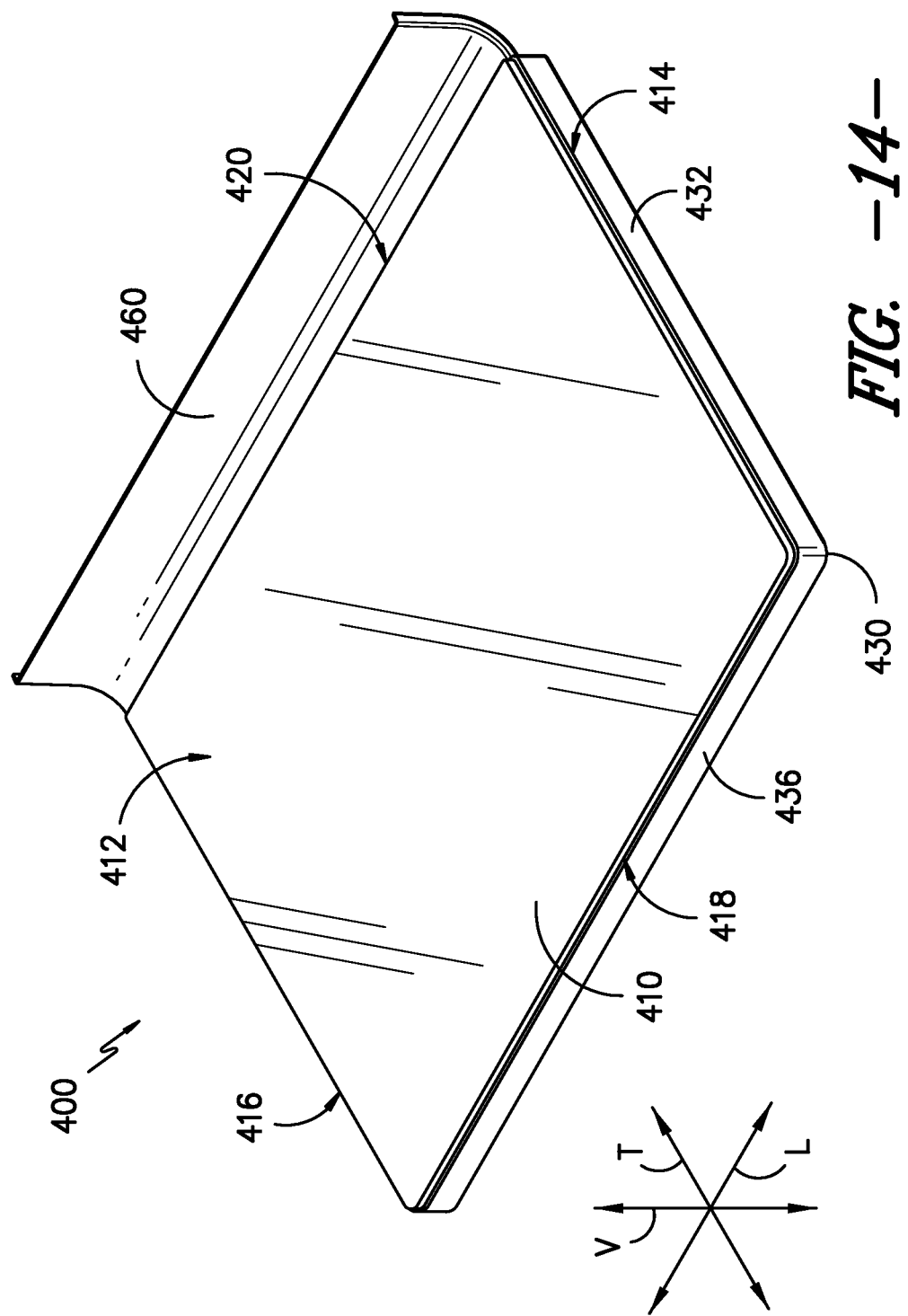
FIG. -14-

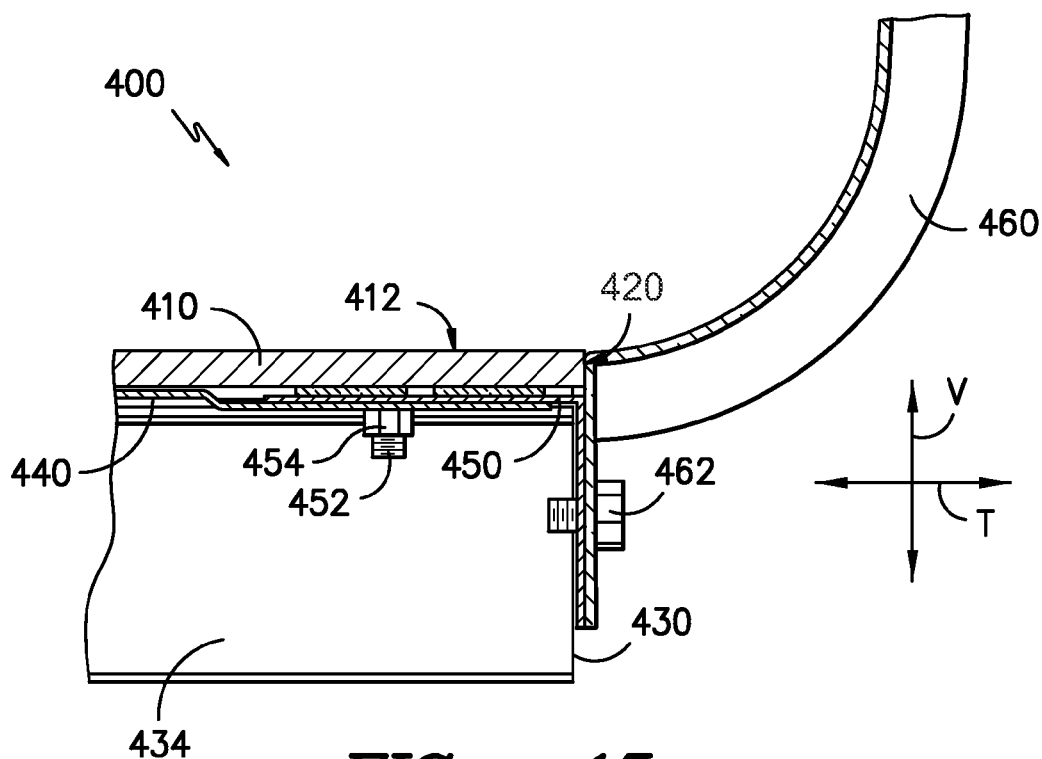
FIG. -15-
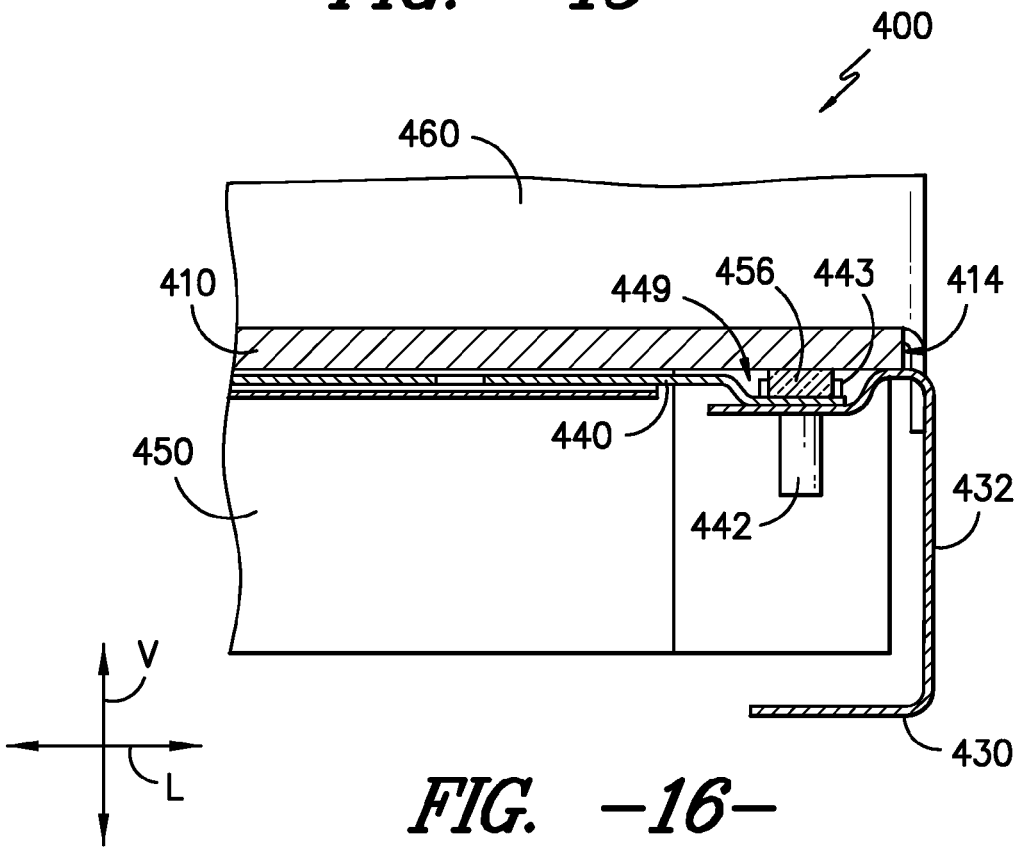
FIG. -16-

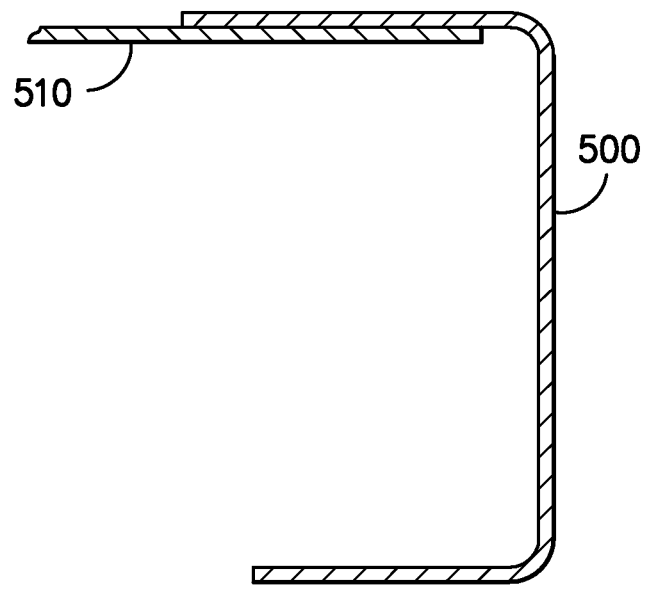
FIG. -17-
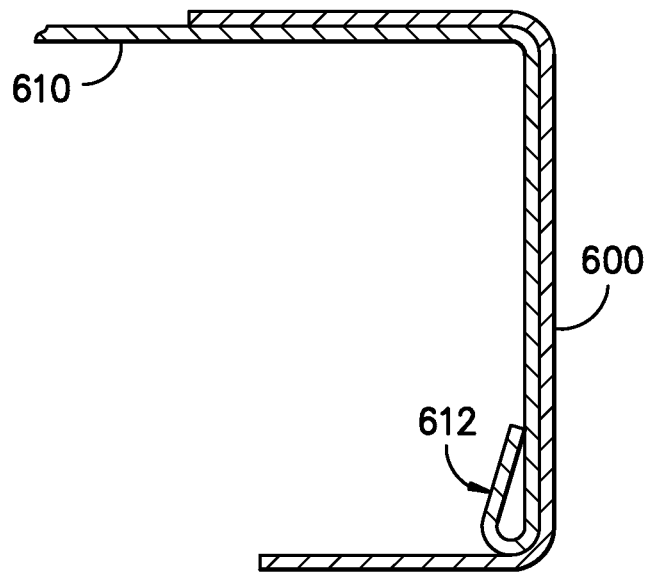
FIG. -18-

OVEN RANGE APPLIANCE

FIELD OF THE INVENTION

The present subject matter relates generally to oven range appliances, such as oven range appliances with ceramic cooktops.

BACKGROUND OF THE INVENTION

Certain oven range appliances include a ceramic panel with a cooking surface for supporting cooking utensils thereon. In such oven range appliances, the ceramic panels are generally mounted within a stamped metal frame such that the stamped metal frame surrounds the ceramic panel and the cooking surface of the ceramic panel is recessed within the stamped metal frame. By surrounding the ceramic panel and recessing the cooking surface, liquids on the cooking surface can be contained on the ceramic panel by the stamped metal sheet.

Mounting the ceramic panel within the stamped metal sheet has certain drawbacks. Debris and dirt can collect within a joint between the stamped metal sheet and the ceramic panel. Such debris and dirt can be unsightly and difficult to remove. Tooling for the stamped metal sheet can also be expensive and difficult to modify. In particular, progressive dies can be required to manufacture the stamped metal sheet. Material selection for the stamped metal sheet can also be limited due to the manufacturing process required for the stamped metal sheet.

Accordingly, an oven range appliance with features for reducing debris collection at a ceramic panel of the oven range appliance would be useful. An oven range appliance with features for mounting a ceramic panel to a cabinet of the oven appliance that does not require expensive or time consuming tooling would be useful. An oven range appliance with features for mounting a ceramic panel to a stainless steel frame would be useful.

BRIEF DESCRIPTION OF THE INVENTION

The present subject matter provides an oven range appliance. The oven range appliance includes a cabinet. The cabinet defines a width. A cooktop is positioned at a top portion of the cabinet. The cooktop includes a ceramic panel. The ceramic panel defines a width. The width of the ceramic panel is about equal to the width of the cabinet. Thus, the ceramic panel can extend across the width of the cabinet. Additional aspects and advantages of the invention will be set forth in part in the following description, or may be apparent from the description, or may be learned through practice of the invention.

In a first exemplary embodiment, an oven range appliance is provided. The oven range appliance defines a vertical direction, a lateral direction and a transverse direction. The vertical, lateral and transverse directions are mutually perpendicular. The oven range appliance includes a cabinet that defines a cooking chamber. The cabinet extends between a first side and a second side along the lateral direction. The cabinet also extends between a front and a back along the transverse direction. The cabinet has a continuous frame positioned above the cooking chamber along the vertical direction. The continuous frame has a first leg, a second leg and a third leg. The first leg of the continuous frame is positioned at the first side of the cabinet and extends from the front of the cabinet towards the back of the cabinet along the transverse direction. The second leg of the continuous frame is positioned at the second side of the cabinet and extends from the front of the cabinet towards the back of the cabinet along the transverse direction. The third leg of the continuous frame is positioned at the front of the cabinet and extends between the first and second legs of the continuous frame along the lateral direction. A ceramic panel is mounted to the continuous frame such that the ceramic panel is positioned above the continuous frame along the vertical direction. The ceramic panel extends between a first side edge and a second side edge along the lateral direction. The first side edge of the ceramic panel is positioned at the first leg of the continuous frame. The second side edge of the ceramic panel is positioned at the second leg of the continuous frame. The ceramic panel also extends between a front edge and a back edge along the transverse direction. The front edge of the ceramic panel is positioned at the third leg of the continuous frame.

In a second exemplary embodiment, an oven range appliance is provided. The oven range appliance defines a lateral direction and a transverse direction. The lateral and transverse directions are perpendicular to each other. The oven range appliance includes a cabinet that defines a cooking chamber. The cabinet defines a width along the lateral direction. A cooktop is positioned at a top portion of the cabinet. The cooktop includes a ceramic panel. The ceramic panel defines a width along the lateral direction. The width of the ceramic panel is about equal to the width of the cabinet along the lateral direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of an oven range appliance according to an exemplary embodiment of the present subject matter.

FIG. 2 provides a perspective view of an oven range appliance according to another exemplary embodiment of the present subject matter.

FIG. 3 provides a perspective view of an oven range appliance according to an additional exemplary embodiment of the present subject matter.

FIG. 4 provides a perspective view of a cooktop according to an exemplary embodiment of the present subject matter.

FIG. 5 provides an exploded view of the exemplary cooktop of FIG. 4.

FIGS. 6, 7, 8, 9, 10, 11, 12, 13 and 14 illustrate a ceramic panel and a frame of the exemplary cooktop of FIG. 4 shown in various stages of assembly.

FIG. 15 provides a rear, partial section view of the exemplary ceramic panel and the exemplary frame of FIG. 14.

FIG. 16 provides a side, partial section view of the exemplary ceramic panel and the exemplary frame of FIG. 14.

FIGS. 17 and 18 provide partial, section views of various exemplary mechanisms for mounting a heating element mounting bracket to a frame.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of an oven range appliance 100 according to an exemplary embodiment of the present subject matter. Oven range appliance 100 defines a vertical direction V, a lateral direction L and a transverse direction T. The vertical, lateral and transverse directions V, L and T are mutually perpendicular and form an orthogonal direction system.

Oven range appliance 100 includes an insulated cabinet 110. Cabinet 110 extends between a first side 112 and a second side 114, e.g., along the lateral direction L. Cabinet 110 also extends between a front 116 and a back 118, e.g., along the transverse direction T. In addition, cabinet 110 defines an upper cooking chamber 120 and a lower cooking chamber 122. Thus, oven range appliance 100 is generally referred to as a double oven range appliance. As will be understood by those skilled in the art, oven range appliance 100 is provided by way of example only, and the present subject matter may be used in any suitable oven range appliance, e.g., a single oven range appliance. Thus, the exemplary embodiment shown in FIG. 1 is not intended to limit the present subject matter to any particular cooking chamber configuration or arrangement.

Upper and lower cooking chambers 120 and 122 are configured for the receipt of one or more food items to be cooked. Oven range appliance 100 includes an upper door 124 and a lower door 126 rotatably attached to cabinet 110, e.g., at or adjacent front 116 of cabinet 110, in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass window panes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

A control panel 132 includes a plurality of user inputs 134. Control panel 132 provides selections for user manipulation of the operation of oven range appliance 100. For example, a user can actuate user inputs 134 and various components of oven range appliance 100 can be operated in response to user manipulation of user inputs 134. User inputs 134 may include various input components, such as one or more of a variety of touch-type controls, electrical, mechanical or electro-mechanical input devices including rotary dials, push buttons, and touch pad.

Oven range appliance 100 also includes a cooktop 140. Cooktop 140 is positioned at or adjacent a top portion of cabinet 110. Thus, cooktop 140 is positioned above upper and lower cooking chambers 120 and 122, e.g., along the vertical direction V. Cooktop 140 includes heating elements 142 and a ceramic panel 144. Heating elements 142 are positioned below ceramic panel 144, e.g., along the vertical direction V, and are operable to heat items, such as pots, pans, griddles, etc. In particular, ceramic panel 144 defines a cooking or top surface 146. Items, such as pots, pans, etc., can rest on top surface 146 and be heated by heating elements 142.

As may be seen in FIG. 1, cabinet 110 defines a width WC along the lateral direction L, e.g., between first and second sides 112 and 114 of cabinet 110. Ceramic panel 144 also defines a width WP along the lateral direction L. The width WP of ceramic panel 144 is, e.g., about, equal to the width WC of cabinet 110. Thus, ceramic panel 144 extends across cabinet 110, e.g., between first and second sides 112 and 114 of cabinet 110, along the lateral direction L.

Ceramic panel 144 extends between a first side edge 150 and a second side edge 152, e.g., along the lateral direction L. Thus, first and second side edges 150 and 152 are spaced apart from each other, e.g., along the lateral direction L. In particular, first side edge 150 may be substantially parallel to second side edge 152. First side edge 150 of ceramic panel 144 is disposed, e.g., directly, above first side 112 of cabinet 110 along the vertical direction V. Conversely, second side edge 152 of ceramic panel 144 is disposed, e.g., directly, above second side 114 of cabinet 110 along the vertical direction V.

Ceramic panel 144 extends between a front edge 154 and a back edge 156, e.g., along the transverse direction T. Thus, front and back edges 154 and 156 are spaced apart from each other, e.g., along the transverse direction T. In particular, front edge 154 may be substantially parallel to back edge 156. Front edge 154 of ceramic panel 144 is disposed above front 116 of cabinet 110 along the vertical direction V. Front edge 154 of ceramic panel 144 is also disposed, e.g., directly, above upper door 120 along the vertical direction V.

First and second side edges 150 and 152 of ceramic panel 144 are exposed such that the first and second side edges 150 and 152 of ceramic panel 144 are visible to a user of oven range appliance 100. Thus, when oven range appliance 100 is fully assembled, the user of oven range appliance 100 can see first and second side edges 150 and 152 of ceramic panel 144 when standing next to or in front of oven range appliance 100. Front edge 154 of ceramic panel 144 is also exposed such that the front edge 154 of ceramic panel 144 is visible to a user of oven range appliance 100. Thus, when oven range appliance 100 is fully assembled, the user of oven range appliance 100 can see front edge 154 of ceramic panel 144 when standing next to or in front of oven range appliance 100.

As may be seen in FIG. 1, cabinet 110 includes a frame 170. Frame 170 is disposed below ceramic panel 144, e.g., along the vertical direction V. Frame 170 extends along first side edge 150, front edge 154 and second side edge 152 of ceramic panel 144 below ceramic panel 144. Ceramic panel 144 is rests on and is mounted to frame 170. As an example, adhesive tape and/or silicon adhesive can extend between and adhere to ceramic panel 144 and frame 170 in order to mount ceramic panel 144 to frame 170. Outer surfaces of frame 170 are also exposed such that the outer surfaces of frame 170 are visible to a user of oven range appliance 100. Thus, when oven range appliance 100 is fully assembled, the user of oven range appliance 100 can see the outer surfaces of frame 170 when standing next to or in front of oven range appliance 100.

Cabinet 110 also includes a backsplash 180. Backsplash 180 is positioned at or adjacent back 118 of cabinet 110. Backsplash 180 defines an outer surface 182. Top surface 146 of ceramic panel 144 is substantially perpendicular to at least a portion of outer surface 182 of backsplash 180. In the exemplary embodiment shown in FIG. 1, backsplash 180 includes a curved portion 184 that terminates at or adjacent top surface 146 of ceramic panel 144 such that the top surface 146 of ceramic panel 144 is substantially flush with the surface of curved portion 184 of backsplash 180 at a joint between ceramic and backsplash 180. Thus, outer surface 182 of backsplash 180 terminates at top surface 146 of ceramic panel 144.

By having ceramic panel 144 extend across cabinet 110 along the lateral direction L, dirt and debris collection at gaps and joints between ceramic panel 144 and frame 170 can be reduced or eliminated. In addition, top surface 146 of ceramic panel 144 can have an increased visible area. Further, the presence of visible silicon adhesive can be reduced or eliminated.

FIG. 2 provides a perspective view of an oven range appliance 200 according to another exemplary embodiment of the present subject matter. Oven range appliance 200 is substantially similar to oven range appliance 100 (FIG. 1) and may include similar components and be constructed in a similar manner. As may be seen in FIG. 2, oven range appliance 200 includes a ceramic panel 210. Ceramic panel 210 defines a top surface 212 for supporting cooking utensils thereon. Oven range appliance 200 also includes a backsplash 220. Backsplash 220 defines an outer surface 222.

Top surface 212 of ceramic panel 210 is substantially perpendicular outer surface 222 of backsplash 220. In the exemplary embodiment shown in FIG. 1, top surface 212 of ceramic panel 210 terminates at or adjacent outer surface 222 of backsplash 220. Thus, backsplash 220 extends past or across ceramic panel 210 along the vertical direction V, and ceramic panel 210 abuts backsplash 220.

FIG. 3 provides a perspective view of an oven range appliance 300 according to an additional exemplary embodiment of the present subject matter. Oven range appliance 300 is substantially similar to oven range appliance 100 (FIG. 1) and may include similar components and be constructed in a similar manner. As may be seen in FIG. 3, oven range appliance 300 includes a ceramic panel 310. Ceramic panel 310 defines a top surface 312 for supporting cooking utensils thereon. Oven range appliance 300 also includes a backsplash 320. Backsplash 320 defines an outer surface 322.

At least a portion of top surface 312 of ceramic panel 310 is substantially perpendicular outer surface 322 of backsplash 320. However, ceramic panel 310 includes an upswept back edge 314. Upswept back edge 314 defines a ninety degree bend. Thus, a tangent line at a bottom portion of upswept back edge 314 and a tangent line at a top portion of upswept back edge 314 can define an angle α therebetween. The angle α can be any suitable angle. For example, the angle α may be less than about one hundred and ten degrees and greater than about seventy degrees.

FIG. 4 provides a perspective view of a cooktop 400 according to an exemplary embodiment of the present subject matter. FIG. 5 provides an exploded view of cooktop 400. Cooktop 400 can be used with any suitable oven range appliance. For example, cooktop 400 may be used in or with oven range appliance 100 as cooktop 140 (FIG. 1). Cooktops of oven range appliance 200 (FIG. 2) and/or oven range appliance 300 (FIG. 3) may also be constructed in a similar manner as cooktop 400.

As may be seen in FIG. 4, cooktop 400 includes a ceramic panel 410 and a continuous frame 430. As discussed in greater detail below, ceramic panel 410 is mounted to continuous frame 430, e.g., such that ceramic panel 410 is positioned above continuous frame 430 along the vertical direction V. Continuous frame 430 may be mounted to cabinet 110 of oven range appliance 100 such that continuous frame 430 is positioned above upper cooking chamber 120 along the vertical direction V. Ceramic panel 410 may contact continuous frame 430, or ceramic panel 410 may be spaced apart from a top surface of continuous frame 430 along the vertical direction V. For example, ceramic panel 410 may be spaced apart from the top surface of continuous frame 430 along the vertical direction V by about two hundredths of an inch.

As may be seen in FIG. 5, continuous frame 430 has a first leg 432, a second leg 434 and a third leg 436. First leg 432, second leg 434 and third leg 436 can be positioned and/or oriented such that continuous frame 430 is substantially u-shaped, e.g., in a plane that is perpendicular to the vertical direction V. In particular, first leg 432 and second leg 434 may be substantially parallel to each other and third leg 436 may be substantially perpendicular to first and second legs 432 and 434, e.g., in a plane that is perpendicular to the vertical direction.

Continuous frame 430 can be constructed in any suitable manner, e.g., such that first, second and third legs 432, 434, and 436 of continuous frame 430 are integrally mounted to one another. For example, continuous frame 430 may be constructed of or with a single, continuous piece of material. In particular, continuous frame 430 may be roll formed from a sheet of steel, such as stainless steel or coated steel (e.g., enamel coated or painted).

First leg 432 of continuous frame 430 may be positioned at or proximate first side 112 of cabinet 110. In particular, first leg 432 of continuous frame 430 may extend from front 116 of cabinet 110 towards back 118 of cabinet 110, e.g., along the transverse direction T, at first side 112 of cabinet 110. Second leg 434 of continuous frame 430 may be positioned at or proximate second side 114 of cabinet 110. In particular, second leg 434 of continuous frame 430 may extend from front 116 of cabinet 110 towards back 118 of cabinet 110, e.g., along the transverse direction T, at second side 114 of cabinet 110. Third leg 436 of continuous frame 430 may be positioned at or proximate front 116 of cabinet 110. In particular, third leg 436 of continuous frame 430 may extending between first and second legs 432 and 434 of continuous frame 430, e.g., along the lateral direction L, at front 116 of cabinet 110.

Ceramic panel 410 has a first side edge 414 and a second side edge 416. First and second side edges 414 and 416 are spaced apart from each other, e.g., along the lateral direction L. First side edge 414 of ceramic panel 410 is positioned at first leg 432 of continuous frame 430. In particular, first side edge 414 of ceramic panel 410 may be positioned directly above first leg 432 of continuous frame 430, e.g., along the vertical direction V. As another example, first side edge 414 of ceramic panel 410 may be inset from an outer surface of first leg 432 of continuous frame 430, e.g., along the lateral direction L by about one tenth of an inch. Second side edge 416 of ceramic panel 410 is positioned at second leg 434 of continuous frame 430. In particular, second side edge 416 of ceramic panel 410 may be positioned directly above second leg 434 of continuous frame 430, e.g., along the vertical direction V. As another example, second side edge 416 of ceramic panel 410 may be inset from an outer surface of second leg 434 of continuous frame 430, e.g., along the lateral direction L by about one tenth of an inch.

Ceramic panel 410 also has a front edge 418 and a back edge 420. Front and back edges 418 and 420 of ceramic panel 410 are spaced apart from each other, e.g., along the transverse direction T. Front edge 418 of ceramic panel 410 is positioned at third leg 436 of continuous frame 430. In particular, front edge 418 of ceramic panel 410 may be positioned directly above third leg 436 of continuous frame 430, e.g., along the vertical direction V. As another example, front edge 418 of ceramic panel 410 may be inset from an outer surface of third leg 436 of continuous frame 430, e.g., along the transverse direction T by about one tenth of an inch.

First and second side edges 414 and 416 of ceramic panel 410 may extend between front and back edges 418 and 420 of ceramic panel 410, e.g., along the transverse direction T. Similarly, front and back edges 418 and 420 of ceramic panel 410 may extend between first and second side edges 414 and 416 of ceramic panel 410, e.g., along the lateral direction L. In particular, ceramic panel 410 may define a rectangular shape, e.g., in a plane that is perpendicular to the vertical direction V.

By positioning continuous frame 430 below ceramic panel 410, ceramic panel 410 extends across a width of continuous frame 430, e.g., along the lateral direction L. In addition, first and second side edges 414 and 416 of ceramic panel 410 and front edge 418 of ceramic panel 410 are also exposed. Thus, a user of cooktop 400 can see first and second side edges 414 and 416 of ceramic panel 410 and front edge 418 of ceramic panel 410 when standing next to or in front of cooktop 400.

As may be seen in FIG. 5, cooktop 400 also includes a heating element mounting bracket 440. Heating element mounting bracket 440 is mounted to continuous frame 430 and is positioned below ceramic panel 410, e.g., along the vertical direction V. A plurality of heating elements (not shown), such as electric resistance heating element, induction heating elements, etc., can be mounted to and supported by heating element mounting bracket 440.

Cooktop 400 also includes a rear bracket 450 and a backsplash 460. Rear bracket 450 is mounted to ceramic panel 410, e.g., along back edge 420 of ceramic panel 410. Backsplash 460 is mounted to rear bracket 450, e.g., such that a top surface 412 of ceramic panel 410 is substantially perpendicular to at least a portion of an outer surface 464 of backsplash 460.

FIGS. 6, 7, 8, 9, 10, 11, 12, 13 and 14 illustrate cooktop 400 in various stages of assembly. An exemplary method for mounting of ceramic panel 410 to continuous frame 430 is discussed in greater detail below with reference to FIGS. 6, 7, 8, 9, 10, 11, 12, 13 and 14. Turning now to FIG. 6, rear bracket 450 is shown spaced apart from ceramic panel 410. Adhesive tape 456 is positioned on rear bracket 450. As may be seen in FIG. 7, an assembler mounts rear bracket 450 to ceramic panel 410 along back edge 420 of ceramic panel 410. In particular, the assembler can press rear bracket 450 onto ceramic panel 410 such that adhesive tape 456 extends between and adheres to rear bracket 450 and ceramic panel 410. As may be seen in FIG. 7, a mounting surface 458 of rear bracket 450 may be positioned or disposed flush or coplanar with back edge 420 of ceramic panel 410, e.g., in a plane that is perpendicular to the transverse direction T, when rear bracket 450 is mounted to ceramic panel 410.

Turning now to FIG. 8, heating element mounting bracket 440 is shown spaced apart from continuous frame 430. As may be seen in FIG. 9, the assembler can mount heating element mounting bracket 440 to continuous frame 430. In particular, the assembler can screw fasteners 442 through heating element mounting bracket 440 into continuous frame 430 in order to mount heating element mounting bracket 440 to continuous frame 430 as shown in FIG. 9.

Turning now to FIG. 10, the assembler applies silicon adhesive 444 and adhesive tape 456 to heating element mounting bracket 440 and/or continuous frame 430. As may be seen in FIG. 11, the assembler aligns ceramic panel 410 above heating element mounting bracket 440 and continuous frame 430. Turning now to FIG. 12, the assembler presses ceramic panel 410 onto heating element mounting bracket 440 and continuous frame 430. Thus, silicon adhesive 444 and adhesive tape 456 extend between and adhere to ceramic panel 410 and heating element mounting bracket 440 and/or continuous frame 430. Additional features of rear bracket 450 that assist with coupling ceramic panel 410 and heating element mounting bracket 440 are discussed in greater detail below with reference to FIG. 15.

Turning now to FIG. 13, backsplash 460 is shown spaced apart from rear bracket 450. The assembler can mount backsplash 460 to rear bracket 450. In particular, the assembler can screw fasteners 462 through backsplash 460 into rear bracket 450 in order to mount backsplash 460 to rear bracket 450. As may be seen in FIG. 14, cooktop 400 can be assembled utilizing such step.

FIG. 15 provides a rear, partial section view of ceramic panel 410 and continuous frame 430. As may be seen in FIG. 15, cooktop 400 includes threaded projections 452 mounted to rear bracket 450 and extending downwardly along the vertical direction V from rear bracket 450. Threaded projections 452 extend through heating element mounting bracket 440, and nuts 454 are threaded or mounted onto threaded projections 452 in order to couple ceramic panel 410 to heating element mounting bracket 440 with rear bracket 450.

FIG. 16 provides a side, partial section view of ceramic panel 410 and continuous frame 430. As may be seen in FIG. 16, continuous frame 430 and/or heating element mounting bracket 440 can include recesses 449 for receiving a head 443 of fasteners 442. In such a manner, ceramic plate 410 can rest or be support on continuous frame 430 and/or heating element mounting bracket 440 rather than the heads of fasteners 442.

FIGS. 17 and 18 provide partial, section views of various exemplary mechanisms for mounting a heating element mounting bracket to a frame. In FIG. 17, a heating element mounting bracket 510 is mounted to a continuous frame 500. In particular, heating element mounting bracket 510 is welded or adhered to continuous frame 500. In such a manner, heating element mounting bracket 510 and continuous frame 500 need not include recesses to account for heads of fasteners.

In FIG. 18, a heating element mounting bracket 610 is also mounted to a continuous frame 600. In particular, heating element mounting bracket 610 is snap fit to continuous frame 500 with a flange 612 of heating element mounting bracket 610 received by continuous frame 500. In such a manner, heating element mounting bracket 610 and continuous frame 600 need not include recesses to account for heads of fasteners.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven range appliance defining a vertical direction, a lateral direction and a transverse direction, the vertical, lateral and transverse directions being mutually perpendicular, the oven range appliance comprising:
    a cabinet that defines a cooking chamber, the cabinet extending between a first side and a second side along the lateral direction, the cabinet also extending between a front and a back along the transverse direction, the cabinet having a continuous frame positioned above the cooking chamber along the vertical direction, the continuous frame having a first leg, a second leg and a third leg, the first leg of the continuous frame positioned above the first side of the cabinet along the vertical direction and extending from the front of the cabinet towards the back of the cabinet along the transverse direction, the second leg of the continuous frame positioned above the second side of the cabinet along the vertical direction and extending from the front of the cabinet towards the back of the cabinet along the transverse direction, the third leg of the continuous frame positioned above the front of the cabinet along the vertical direction and extending between the first and second legs of the continuous frame along the lateral direction;
    a ceramic panel mounted to the continuous frame such that the ceramic panel is positioned completely above the continuous frame along the vertical direction, the ceramic panel extending between a first side edge and a second side edge along the lateral direction, the first side edge of the ceramic panel positioned above the first leg of the continuous frame along the vertical direction and inset from an outer surface of the first leg along the lateral direction, the second side edge of the ceramic panel positioned above the second leg of the continuous frame along the vertical direction and inset from an outer surface of the second leg along the lateral direction, the ceramic panel also extending between a front edge and a back edge along the transverse direction, the front edge of the ceramic panel positioned above the third leg of the continuous frame along the vertical direction and inset from an outer surface of the third leg along the transverse direction,
    wherein the first and second side edges of the ceramic panel and the front edge of the ceramic panel are exposed such that the first and second side edges of the ceramic panel and the front edge of the ceramic panel are visible.

2. The oven range appliance of claim 1, wherein the first, second and third legs of the continuous frame are integrally mounted to one another.

3. The oven range appliance of claim 1, wherein the continuous frame comprises stainless steel or coated steel.

4. The oven range appliance of claim 1, further comprising a heating element mounting bracket and adhesive tape, the heat element mounting bracket mounted to a top surface of the continuous frame, the adhesive tape extending between and adhering to the heating element mounting bracket and the ceramic panel.

5. The oven range appliance of claim 1, further comprising a heating element mounting bracket for supporting a plurality of heating elements, the heating element mounting bracket mounted to the continuous frame with a plurality of fasteners, silicon adhesive extending between and adhering to the heating element mounting bracket and the ceramic panel.

6. The oven range appliance of claim 1, wherein the ceramic plate is substantially rectangular and the continuous frame is substantially u-shaped in a plane that is perpendicular to the vertical direction.

7. The oven range appliance of claim 1, further comprising a rear bracket and a backsplash, the rear bracket mounted to the ceramic panel along the back edge of the ceramic panel, adhesive tape extending between and adhering to the rear bracket and the ceramic panel, the backsplash mounted to the rear bracket such that a top surface of the ceramic panel is substantially perpendicular to an outer surface of the backsplash.

8. The oven range appliance of claim 7, further comprising threaded projections, a plurality of nuts and a heating element mounting bracket for supporting a plurality of heating elements, the threaded projections mounted to the rear bracket and extending downwardly along the vertical direction from the rear bracket, the threaded projections extending through the heating element mounting bracket, each nut of the plurality of nuts threaded onto a respective one of the threaded projections.

9. The oven range appliance of claim 7, further comprising a plurality of fasteners extending through the backsplash and the rear bracket.

10. The oven range appliance of claim 7, wherein the back edge of the ceramic panel abuts the outer surface of the backsplash.

11. The oven range appliance of claim 7, wherein the backsplash includes a curved outer surface portion that is flush with the top surface of the ceramic panel.

12. An oven range appliance defining a vertical direction, a lateral direction and a transverse direction, the vertical, lateral and transverse directions being mutually perpendicular, the oven range appliance comprising:
    a cabinet that defines a cooking chamber, the cabinet extending between a first side portion and a second side portion along the lateral direction, the cabinet also extending between a front portion and a back portion along the transverse direction; and
    a cooktop positioned at a top portion of the cabinet, the cooktop comprising a ceramic panel, the ceramic panel extending between a first side edge and a second side edge, the first side edge of the ceramic panel positioned completely above the first side of the cabinet along the vertical direction and inset from an outer surface of the first side of the cabinet along the lateral direction, the second side edge of the ceramic panel positioned completely above the second side of the cabinet along the vertical direction and inset from an outer surface of the second side of the cabinet along the lateral direction, the ceramic panel also extending between a front edge and a back edge, the front edge of the ceramic panel positioned above the front of the cabinet along the vertical direction and inset from the front of the cabinet along the transverse direction, wherein the first and second side edges of the ceramic panel and the front edge of the ceramic panel are visible to a user of the oven range appliance.

13. The oven range appliance of claim 12, wherein the cabinet comprises a backsplash positioned at a back portion of the cabinet, the backsplash defining an outer surface, the ceramic panel defining a top surface, the top surface of the ceramic panel being substantially perpendicular to the outer surface of the backsplash.

14. The oven range appliance of claim 13, wherein the outer surface of the backsplash terminates at the top surface of the ceramic panel.

15. The oven range appliance of claim 13, wherein the top surface of the ceramic panel terminates at the outer surface of the backsplash.

16. The oven range appliance of claim 13, wherein the back edge of the ceramic panel abuts the outer surface of the backsplash.

17. The oven range appliance of claim 13, wherein the backsplash includes a curved outer surface portion that is substantially flush with the top surface of the ceramic panel.

18. The oven range appliance of claim 12, wherein the ceramic panel comprises an upswept back edge.

19. The oven range appliance of claim 18, wherein a tangent line at a bottom portion of the upswept back edge and a tangent line at a top portion of the upswept back edge define an angle $\alpha$ therebetween, the angle $\alpha$ being less than about one hundred and ten degrees and greater than about seventy degrees.

* * * * *